R. R. HART.
VEHICLE BRAKE.
APPLICATION FILED JULY 1, 1909.
938,322.
Patented Oct. 26, 1909.
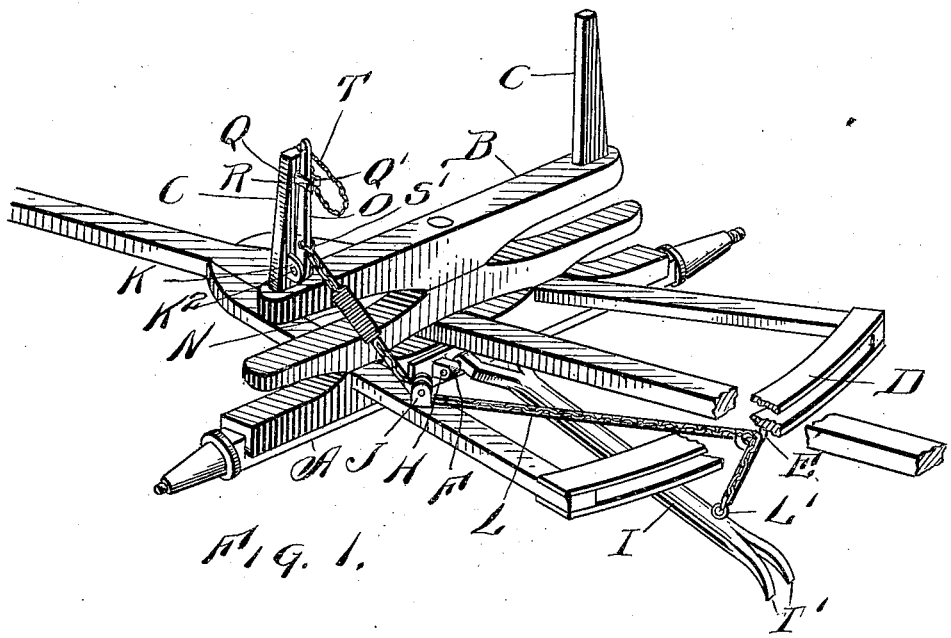
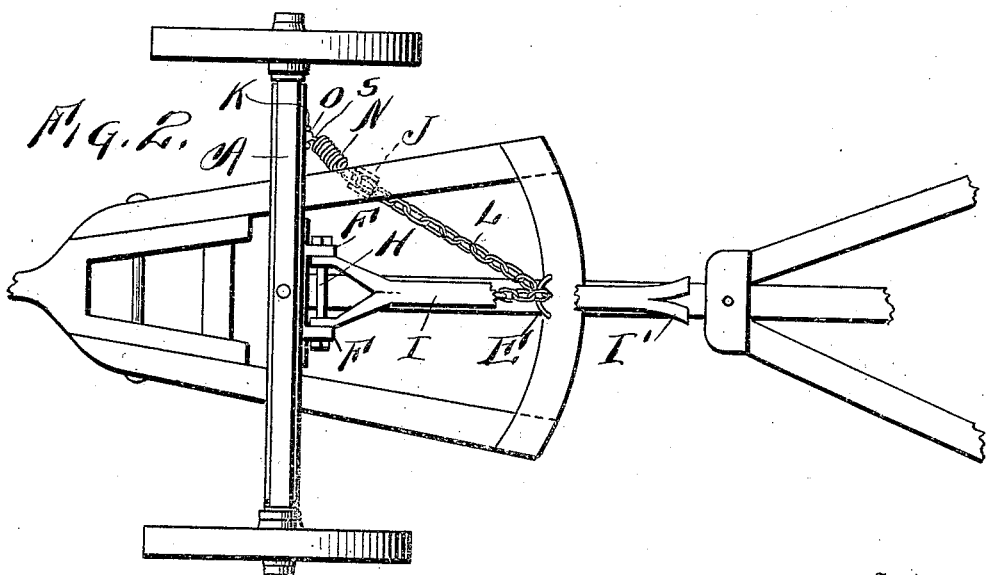
Witnesses
Inventor
Roy R Hart,
By
Attorney

UNITED STATES PATENT OFFICE.

ROY R. HART, OF RAPATEE, ILLINOIS.

VEHICLE-BRAKE.

938,322.  Specification of Letters Patent.  Patented Oct. 26, 1909.

Application filed July 1, 1909. Serial No. 505,484.

*To all whom it may concern:*

Be it known that I, ROY R. HART, a citizen of the United States, residing at Rapatee, in the county of Knox and State of Illinois, have invented certain new and useful Improvements in Vehicle-Brakes; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in brakes for vehicles and particularly in the provision of means for holding a wagon from going down an inclined way, mechanism being provided to allow the front bolster of the wagon to turn freely without interfering with the brake.

The invention comprises various details of construction, combinations and arrangements of parts which will be hereinafter fully described and then specifically defined in the appended claim.

I illustrate my invention in the accompanying drawings, in which:—

Figure 1 is a perspective view of my improved brake mechanism, and Fig. 2 is a bottom plan view.

Reference now being had to the details of the drawings by letter, A designates the forward axle of a vehicle of the usual construction having a bolster B pivotally mounted thereon, upon which bolster rise the standards C, and D designates the forward hound having an eye E upon the lower under side thereof. Projecting from the rear face of the forward axle are the lugs F provided with registering apertures in which apertures a pin H is mounted, and I designates a brake bar having one end apertured for the reception of said pin upon which the bar is pivotally mounted and its other end is pointed, as at I', and adapted to engage the ground to hold the vehicle while going up an inclined way.

Mounted upon the hound is a pulley J, and K designates a slotted brake arm projecting from one of the standards C and is provided with an aperture for the reception of a pivot pin K² to which a lever O is pivotally mounted. Fastened to the bolster from which said bracket arm projects is a clamping member Q having resilient arms Q' apertured as at R and said clamping member is adapted to engage frictionally and hold the lever in an upright position, as shown in Fig. 1 of the drawings, the apertures in the ends of the clamping member, being for the reception of the pin to further securely hold the lever in an upright position.

A chain L is fastened to an eye L' upon said brake bar and thence passes through the pulley upon the under side of the hound and underneath the pulley upon the side of hound and a spring N is fastened to the end of said chain. Said spring is fastened to a hook S which in turn is connected to said lever above the pivotal point thereof, and T designates a chain which is fastened at one end to the upper end of the standard containing said clamping member and its other end fastened near the free end of the lever and affording means whereby the same may be conveniently raised.

In operation, when the parts are adjusted as shown in Fig. 1 of the drawings, in which the lever is held in upright position, the front bolster will be allowed to turn freely without moving to one side or the other upon the brake bar, the spring which is fastened to the chain and bar yielding in the event of the forward portion of the wagon turning to the right or left. When it is desired to apply the brake, the lever is thrown down, allowing the brake bar to fall by gravity to the ground.

What I claim to be new is:—

In combination with the running gear of a vehicle, a brake bar pivoted to the forward axle thereof, a pulley upon the forward hound of the vehicle, a brake arm projecting from the standard of the bolster, a lever pivoted upon said brake arm, a clamping member upon the standard of the bolster adapted to hold the lever in an upright position, a chain fastened at one end to the brake bar passing over said pulley, a spring connected to said chain and also to said lever, and chain connections between the lever and standard.

In testimony whereof I hereunto affix my signature in the presence of two witnesses.

ROY R. HART.

Witnesses:
C. M. JOHNSON,
MARY E. HART.